Nov. 5, 1963  D. B. YETTER  3,109,558
METHOD OF AND APPARATUS FOR CHARGING A SPRAY TANK
Filed Dec. 5, 1962

INVENTOR.
Dean B. Yetter,
BY Parker & Carter
Attorneys.

United States Patent Office 3,109,558
Patented Nov. 5, 1963

3,109,558
METHOD OF AND APPARATUS FOR CHARGING A SPRAY TANK
Dean B. Yetter, Hebron, Ill., assignor to Crown Industrial Products Company, Woodstock, Ill., a corporation of Delaware
Filed Dec. 5, 1962, Ser. No. 242,479
10 Claims. (Cl. 222—1)

This invention relates to pressurized garden sprays and in particular to a means and method for providing a metered amount of propellant to pressurize a spray tank, and is a continuation in part of my co-pending application Serial No. 5,414, filed January 29, 1960.

One purpose of the present invention is a pressurized garden spray which does not utilize the conventional pump to pressurize the spray tank.

Another purpose is a garden spray utilizing a pressure cartridge or aerosol can to supply sufficient pressure to operate the spray.

Another purpose is an improved pressurizing means for a garden spray or the like wherein a metered amount of propellant, sufficient to pressurize a given spray tank, is introduced therein.

Another purpose is an improved method of pressurizing a garden spray tank wherein a given amount of propellant, consistent with the tank volume, and sufficient to completely empty the tank is admitted into the tank prior to use.

Another purpose is to provide a metering valve for use in a pressurized garden spray tank.

Another purpose is to provide an improved means for admitting a metered amount of propellant into a spray tank for pressurizing thereof.

Another purpose is to provide an improved method of pressurizing a garden spray tank wherein a metered amount of a suitable propellant, for example, Freon, is admitted into the tank prior to use.

Another purpose is an improved method of pressurizing a garden spray tank wherein a liquid propellant, heavier than the spray, and in an amount just sufficient to empty the tank, is placed in the tank prior to use.

Another purpose is a pressurized garden spray which is operated with a minimum waste of propellant.

Other purposes will appear in the ensuing specification, drawings and claims.

The invention is illustrated diagrammatically in the following drawings wherein.

Figure 1:
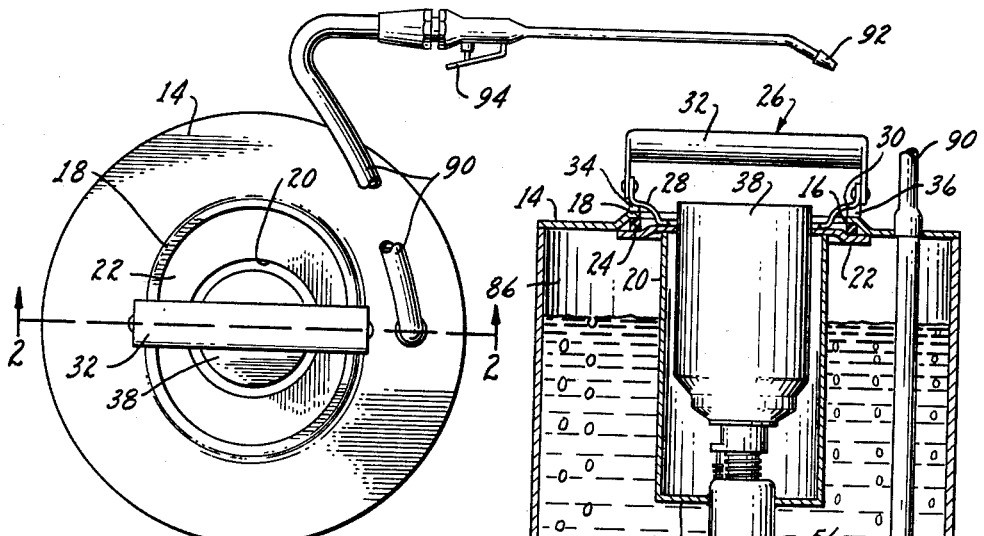
FIGURE 1 is a top plan view of my improved garden spray.

A generally cylindrical tank 10 may have an upwardly domed bottom 12 and a top wall 14 with a generally central aperture 16. As clearly shown in FIGURE 2, there may be an upturned flange or lip 18 surrounding the filling opening or aperture 16. A cylinder or the like 20 may be positioned in the aperture 16 and may have an outwardly extending flange or lip 22 at the upper end thereof which cooperates with the lip 18 and a seal ring 24 positioned therebetween to seal the opening 16. Secured to the upper end of the cylinder 20 is a handle structure 26 including diametrically opposed bracket members 28 and 30 secured to the flange 22, and a handle 32 pivotly mounted at its opposite ends to the bracket members. The cylinder 20 and the associated handle structure are removable and when removed provide an access for filling the tank with the spray liquid. The handle structure is completed by a pair of lugs 34 and 36 secured to the underneath side of the brackets 28 and 30. When the socket 20 is inserted in the tank, the lugs press down against the flange 18 to form a tight seal for the opening 16.

Positioned within the cylinder 20 is a pressure cartridge 38, which may be an aerosol can or it may be otherwise, and which provides propellant for pressurizing the garden spray.

Figure 3:
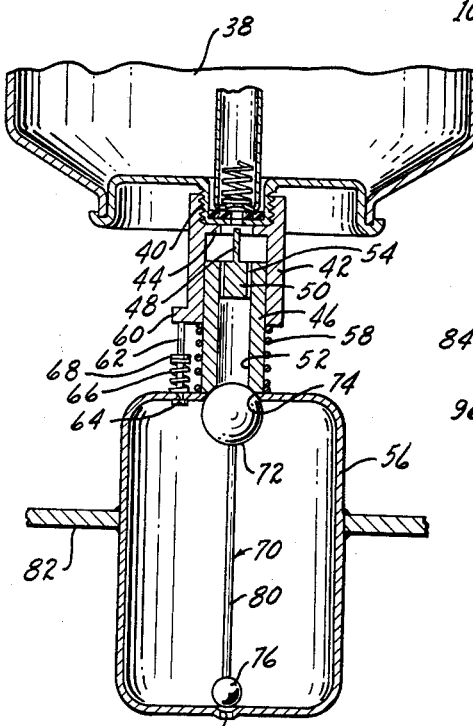
FIGURE 3 is an enlarged section of the metering valve used herein.

FIGURE 3 shows the details of the metering valve used to admit propellant into the tank 10. The cartridge 38 may be suitably screwed into threads 40 formed on the interior surface of a cylindrical slide or socket 42. An interior circular projection or stop 44 determines the extent that the can is received within the slide. The slide or socket 42 is slidably mounted on a support member 46 having a release member or pin or projection 48 extending outwardly therefrom towards the aerosol can 38. When the aerosol can is pressed down it will be opened by the pin 48 and liquid propellant, for example, Freon, will flow therefrom. The pin 48 extends from a block or the like 50 positioned at the end of an axial bore 52 in the support member 46. A plurality of circumferentially spaced small passages or openings 54 are formed in the block 50 so that the liquid propellant may flow through passage or bore 52 and into a suitable metering can 56. A spring 58 surrounds the support member 46 and is seated at one end against the metering can 56 and against the slide 42 at the other end, thereby biasing the slide upward to normally retain the aerosol can away from the release member 48. The slide 42 has a projection 60 on one side thereof in contact with a valve 62 which normally closes an exhaust port 64 in the top of the metering can 56. A small coiled spring or the like 66 is placed against a circular projection 68 on the valve 62 and biases the valve to a normally closed position. It can be easily seen from the above description that when the aerosol can is pressed downwardly against the action of springs 58 and 66, liquid propellant in the aerosol can will flow through passage or bore 52 and into the metering can. At the same time the exhaust port 64 will open to the atmosphere.

Positioned within the metering can 56 is a valve 70 having a ball 72 for closing inlet port 74 and passage 52 and a somewhat smaller ball 76 adapted to close an outlet port 78 in the bottom of the metering can 56. The two balls may be connected together by a suitable rod or stem or pin 80. As shown in the drawings, the metering can may be suitably connected or secured to the bottom 82 of the cylinder 20, although it may be otherwise. For example, the metering can and associated valve may be positioned on or adjacent the top 14 of the tank 10, or along the side of the tank.

Figure 2:
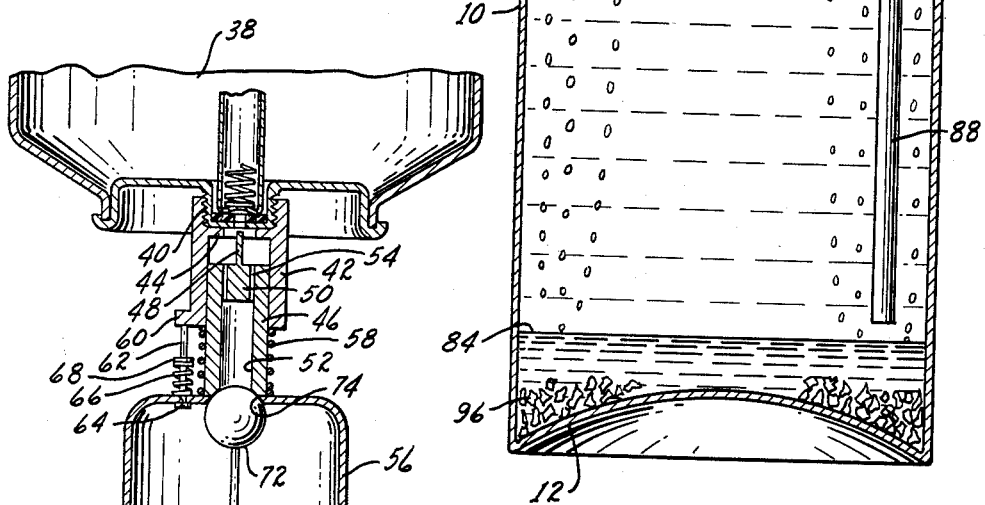
FIGURE 2 is a section along plane 2—2 of FIGURE 1.

In the preferred form of the invention, the metering can may contain sufficient propellant to just completely empty the spray tank of its contents. When a liquid propellant such as Freon is used, being heavier than the spray liquid, which is mainly water, the Freon will fall to the bottom of the tank, as shown in FIGURE 2. As Freon and water are not soluble, there will be an interface or the like 84 formed between the two liquids. Once the spray tank is sealed, some of the Freon will boil off and form a pressure head, indicated at 86, above the spray liquid to force the liquid out of a suitable standpipe or the like 88 which opens just above the interface 84. The standpipe 88 may be suitably connected to a hose or the like 90 having a spray nozzle 92 with a suitable trigger or release 94 thereon. I may position an assortment of nuts, bolts, rocks or other sharp objects, indicated at 96, in the bottom of the tank to facilitate the rise of bubbles forming in the liquid propellant.

The pressure cartridge or aerosol can 38, in addition to containing propellant, may contain a suitable insecticide or other chemical which it is desired to spray. The chemical may be in a concentrate in the aerosol can and will mix with the spray liquid or water. The chemical and the propellant should intermix in the pressure cartridge and the propellant should be chosen from the group of known propellants that will mix with the desired chemical spray. By combining a measured amount of propellant and a known quantity of chemical concentrate it is possible to properly proportion the chemical concentrate and water or other sprayable substance so that the spray will be of the desired strength to do the job intended.

The use, operation and function of the invention are as follows:

Shown and described herein is an improved pressurized garden spray or the like which is suitable for use around the home, for spraying bushes, grass, flowers, etc. Conventional garden sprays of this general type utilize a hand pump or the like to supply pressure to spray the liquid from the tank. In my improved pressurized garden spray I have provided a suitable pressure cartridge, which may be an aerosol can or it may be otherwise, to supply the pressure necessary for spraying the liquid from the tank. Whereas I have described the pressure cartridge as being an aerosol can it should be understood that other types of pressure means may be used, as what is important is to provide a pressure liquid, for example Freon, to pressurize the tank. I prefer a pressure cartridge that contains a liquid rather than a cartridge containing gas under pressure.

It is an object of this invention to provide a means for admitting a metered amount of propellant into the spray tank such that a single shot of propellant will be completely used up in completely emptying the tank. In other words, it is one of the general purposes of this invent to utilize to the fullest the liquid propellant contained in the pressure cartridge or aerosol can. The metering can shown and described herein will provide exactly the proper amount of propellant to completely empty the tank contents. The metering can must be proportioned according to the size of the tank such that an amount of propellant that will completely fill the metering can is the proper amount for completely emptying the spray tank.

In the operation of the pressurizing means it is preferred that the propellant contained in the pressure cartridge be a fluid heavier than water or heavier than the spray liquid. Such a fluid may be liquid Freon. When the liquid Freon is admitted through outlet port 78 into the tank, being heavier than the spray liquid, the Freon will drop directly to the bottom of the spray tank. As clearly indicated in FIGURE 2 the Freon will form a layer at the bottom of the tank as it is not soluble in the spray liquid. The standpipe 88 normally stops just above the Freon level so that it does not extend down into the propellant and only the liquid spray will enter the pipe. The amount of Freon or other liquid propellant that is introduced by the metering valve is consistent with the volume of the particular spray tank so that the propellant will be fully vaporized when all of the liquid is drawn out of the tank. For example, in the preferred form, the amount of propellant may be approximately one-half of one percent by weight of the capacity of the spray tank. In other words, a measured shot of propellant is being substituted for the conventional pump and regardless of the amount of water or spray liquid in the tank this measured shot of propellant will completely empty the tank of its contents.

The tank is sealed once the socket 20 is inserted into the opening 16 and the handle is turned. The Freon then serves as a pressure source. The temperature of the tank and liquid is such that once the liquid propellant is admitted into the tank, a portion of the propellant will boil off forming a pressure head above the liquid. Normally the tank will be pressurized at ambient temperature. The pressure head forces the liquid out of the tank. As the nozzle is operated and the liquid or water is sprayed, the air space above the spray liquid becomes larger and there would be a decrease in pressure except that as the liquid leaves the tank, or the volume of liquid decreases, more propellant will boil off to maintain the tank pressure. In other words, the propellant maintains the tank at a certain pressure consistent with tank volume and the temperature of the liquid, but independent of the volume of liquid in the tank. Thus, in the air space or pressure head there is theoretically a constant pressure always driving the liquid spray out of the tank. In practice, the pressure will stay constant if the liquid is sprayed at a slow rate. However, if the liquid is sprayed too fast, the pressure may drop as the Freon cannot boil off fast enough. The sharp objects in the bottom will facilitate the rising of the bubbles in the Freon. When the liquid is completely out of the tank the propellant will be fully vaporized and will have dropped from, for example, approximately a 60 pound starting pressure to approximately 20 pounds. For purposes of illustration, if there is a three gallon tank, when approximately two-thirds or two gallons of the liquid is gone all of the propellant will be vaporized. The last third of the liquid will be pushed out by the vaporized propellant as it drops from approximately a 60 pound pressure to approximately 20 pounds. It can easily be seen that the amount of liquid in the tank makes no difference as it is only important to have an amount of propellant that is consistent with the volumetric capacity of the tank. It is important in systems such as shown herein to provide just the measured amount of propellant necessary to completely empty the tank.

The particular metering valve described herein will provide just such a measured or metered shot of propellant into the spray tank. In the operation of the metering valve, the aerosol can or pressure cartridge is depressed so that the release member 48 opens the pressure cartridge and permits the liquid propellant to flow down through passage 52 and against the top of ball 72. With no pressure in the metering can, valve 70 will normally close outlet port 78, with port 74 being open to permit the propellant to flow into the can. The downward movement of valve 70 closes the outlet port. As the slide 42 is depressed the exhaust port 64 is opened and the liquid propellant flowing into the metering can forces the air and any gaseous propellant remaining in the can out through the exhaust port. The pressure in the metering can is lower than the propellant can and the liquid propellant will easily flow into the metering can. The pressure cartridge should remain depressed until the metering can is completely filled with liquid propellant. When the metering can is full, liquid propellant will start to escape out of the exhaust port 64 thus giving a visible and audible indication that the metering can is full and that the pressure cartridge should be released. The spring forces the slide upward closing the exhaust port and shutting off the flow of propellant from the pressure cartridge. The propellant under pressure in the metering can will now force the valve 70 into the position of FIGURE 3. As the ball 72 is larger than ball 76 and port 74 is larger than port 78 the pressure on the bottom of ball 72 will tend to move the ball into the upward position closing passage 52 and opening the port 78. Thus the measured shot of the propellant in the metering can will flow down into the spray tank 10.

The pressure cartridge may be left in position in the socket 20 while the liquid is being sprayed from the tank. When the tank is completely emptied, the socket 20 may be removed with no loss of propellant. The tank may again be filled through the opening 16 and the socket 20 replaced. The tank is then pressurized as before, again with an amount of propellant sufficient to expel one tank full of liquid.

Although the metering valve and the associated metering can have been positioned in a cylinder depressed into the spray tank 10, this is not necessary. For example, the metering can may be suitably placed in the side of the tank or in the top of the tank at a position other than the filling opening. The invention is not limited to the particular construction shown in the drawings. The invention additionally is not to be limited to any particular form of valve structure, as the invention generally comprises a means and method of providing a measured shot of propellant for a spray tank such that the tank will be completely emptied of its contents by the metered shot.

As an additional means of providing such a metered shot, it is within the scope of the invention to provide a cartridge or capsule containing liquid propellant and having the outer covering formed of a water soluble material. The spray liquid would dissolve the water soluble covering thereby introducing a measured shot of propellant into the tank. Such cartridges may be generally similar to the small carbon dioxide cartridges used in seltzer bottles.

Whereas the preferred form of the invention has been shown and described herein it should be realized that there are many modifications, substitutions and alterations thereto within the scope of the following claims:

I claim:

1. A garden spray including a tank adapted to contain liquid to be sprayed, a nozzle connected to the tank and adapted to spray liquid therefrom, means to pressurize the tank comprising a metering can, positioned in the tank, and having an inlet and an outlet, means connected to said metering can inlet, and adapted to be communicatively connected to the discharge valve of a pressure, propellant containing, cartridge; a unitary valve means controlling the flow of propellant into said metering can through said inlet, and from said metering can through said outlet into said tank, connection of said connection means to said cartridge discharge valve causing propellant to flow to said inlet and position the valve means to open the inlet and close the outlet, so as to fill the metering can; subsequent disconnection causing closure of the inlet and opening of the outlet whereby propellant flows from the metering can into the tank.

2. The structure of claim 1 further characterized by a socket on said tank, said pressure cartridge adapted to be positioned in said socket, a release member positioned in said socket to contact the pressure cartridge, a passage in said socket connecting said pressure cartridge and said metering can, movement of said cartridge toward said release member releasing propellant in the cartridge for flow through said passage and against said valve.

3. The structure of claim 2 wherein said socket is slidably positioned on said tank, an exhaust port in said metering can and a valve providing a closure therefor, movement of said socket effective to operate said second valve and open said exhaust port.

4. A garden spray including a tank adapted to contain liquid to be sprayed, a nozzle connected to the tank adapted to spray liquid therefrom, means adapted to be communicatively connected to the discharge valve of a pressure, propellant containing, cartridge for pressurizing said tank including a socket slidable on said tank and adapted to mount said pressure cartridge, a release member positioned in said socket to contact the pressure cartridge, a metering can positioned in said tank to receive propellant from said pressure cartridge, a passage connecting said pressure cartridge and metering can, an outlet port in said metering can opening into said tank, and a valve member positioned in said metering can to close either said passage or said outlet port.

5. The structure of claim 4 further characterized by an exhaust port and a valve member therefor, movement of said pressure cartridge toward said metering can opening said exhaust port.

6. The structure of claim 4 wherein propellant flowing through said passage moves said valve member away from said passage to close said outlet port.

7. A method suitable for use in periodically recharging and operating a spray tank, such as a garden spray tank, having a set volume, including the steps of introducing a suitable amount of sprayable substance into the tank, thereafter closing the tank, introducing a liquid propellant heavier than the sprayable substance, and at ambient temperature, into a metering zone within a container opening into the tank, until the zone is completely filled, the volume of the metering zone being related to the volume of the tank such that the metering zone will hold an amount of propellant sufficient to just completely empty the tank regardless of the quantity of sprayable substance within the tank, passing the propellant from the container into the tank, the propellant remaining at least partially in liquid form depending upon the relation between the set volume of the tank and the volume occupied by the sprayable substance, allowing the sprayable substance to escape from the tank in a controlled manner and at the same time freely allowing the liquid propellant to vaporize in the tank and occupy the volume vacated by the expelled sprayable substance until all of the sprayable substance has been expelled, thereafter repeating the charging and operating steps at periodic intervals and as needed.

8. The method of claim 7 further characterized in that the liquid propellant introduced into the metering zone contains chemical to be sprayed from the tank.

9. The method of claim 8 further characterized in that the chemical is mixed with the propellant and is in the form of a concentrate.

10. The method of claim 9 further characterized in that the chemical concentrate mixes with the sprayable substance within the tank.

References Cited in the file of this patent

UNITED STATES PATENTS

| 520,224 | Schroeder | May 22, 1894 |
|---|---|---|
| 966,270 | Van Leir | Aug. 2, 1910 |
| 2,085,956 | Clarke et al. | July 6, 1937 |
| 2,746,796 | St. Germain | May 22, 1956 |
| 2,948,389 | Barnes | July 26, 1960 |
| 2,989,091 | Lowenthal | June 20, 1961 |

FOREIGN PATENTS

| 186,137 | Germany | June 11, 1907 |